Feb. 19, 1929.  
E. R. VIBERG ET AL  
1,702,327  
DUMP CAR LOCKING MECHANISM  
Filed Nov. 6, 1926  
3 Sheets-Sheet 3
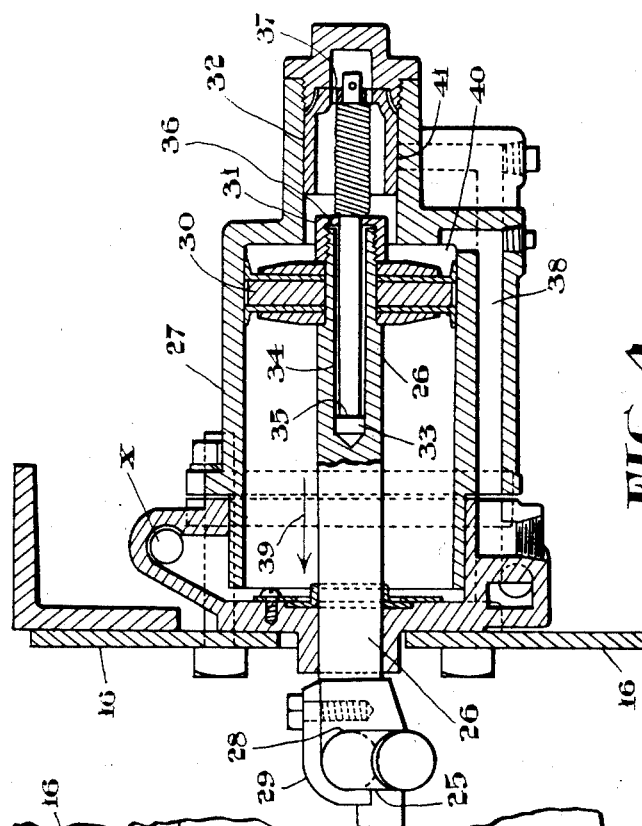
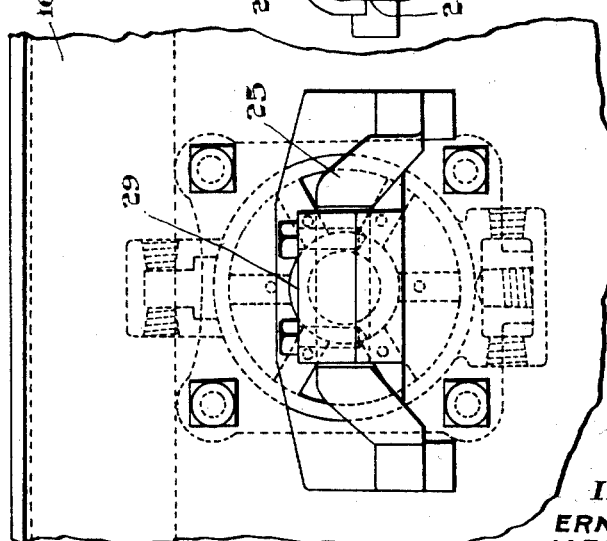
INVENTORS  
ERNEST. R. VIBERG  
ALFONZ. L. LINDERBLAD  
BY *Fetherstonhaugh & Co*  
ATTORNEYS

Patented Feb. 19, 1929.

1,702,327

UNITED STATES PATENT OFFICE.

ERNEST R. VIBERG AND ALFONZ L. LINDERBLAD, OF MONTREAL, QUEBEC, CANADA.

DUMP-CAR-LOCKING MECHANISM.

Application filed November 6, 1926. Serial No. 146,702.

This invention relates to new and useful improvements on dump cars, and particularly to the locking mechanism therefor, and the object of the invention is to provide a simple and efficient locking mechanism which will operate in a positive manner without undue wear on any of its working parts.

Another object is to provide a dump car locking mechanism which will be very easily released or unlocked by means of fluid operated mechanism.

A further object is to provide dump car locking mechanism which will be easily installed and accessible for repairs and the like.

In our invention we provide a car truck having a movable and fixed portion. The movable portion is pivotally mounted on the fixed portion and is provided with downwardly projecting supports which engage with pivotally mounted arms, which are brought into or out of engagement with the supports, by means of links, each pivotally connected at one end to an arm and at the other end to an eccentric secured to the end of a piston-rod, the piston of which operates in a cylinder secured to the fixed portion of the car truck. The eccentric locking mechanism engages with the shoulder of a casting secured in any suitable manner to the center sills of the car frame.

In the drawings which illustrate our form of the invention—

Figure 3 is an end elevation showing the general construction of the eccentric locking bar.

Figure 4 is a sectional side elevation of our preferred form of cylinder and piston mechanism for operating the locking mechanism.

Figure 5 is an end elevation of the mechanism shown in Figure 4.

Figure 1:
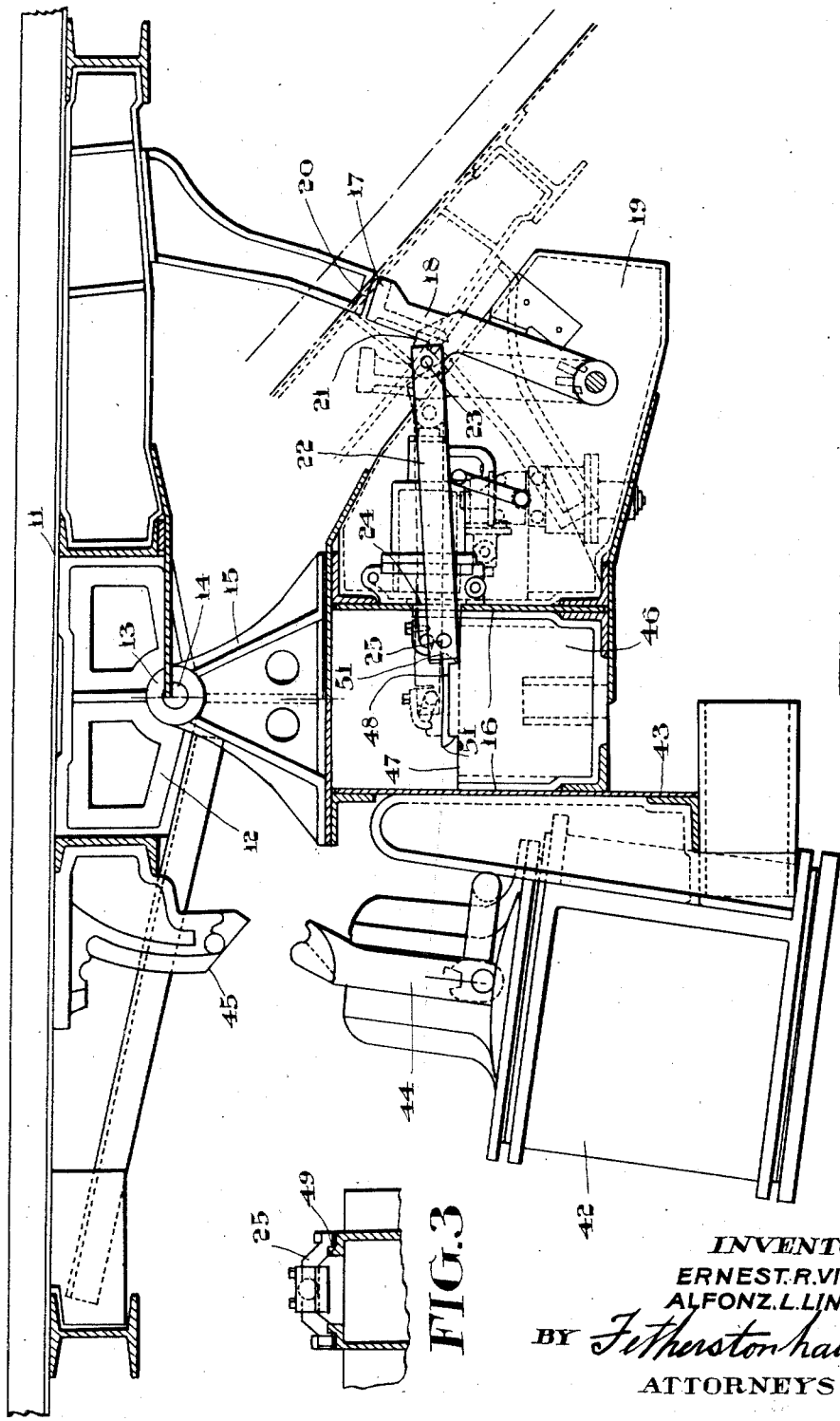
Figure 1 is a part sectional end elevation of part of a dump car showing our improved locking mechanism in position.
Figure 2:
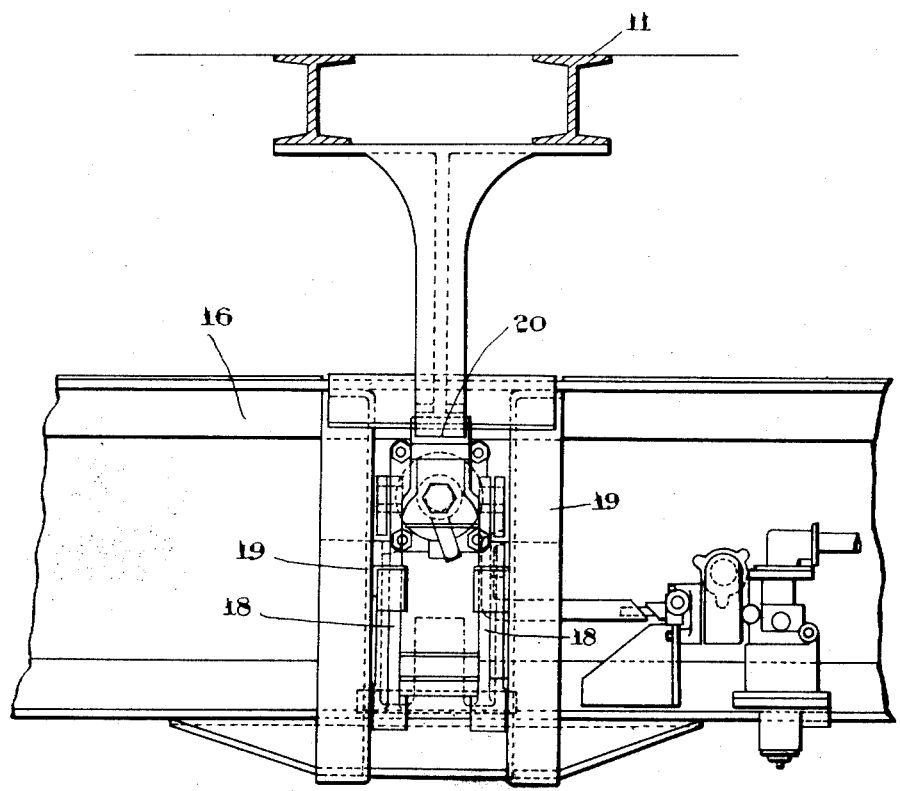
Figure 2 is a part sectional side elevation showing the locking mechanism shown in Figure 1.

Referring more particularly to the drawings, 11 designates the movable or dumping portion of the car body, between the central reinforcing sections 12 of which, are secured the bearings 13 adapted to rotate on a spindle 14 secured to and passing through brackets 15 secured to the car frame 16. In the drawings only a portion of the car truck is shown, but it will be readily understood that the parts disclosed may be multiplied in the construction of the car and placed at spaced intervals thereon, to facilitate easy working of the device and the proper mounting of the movable portion on the fixed portion of the car. Depending from the underside of the movable portion of the car and on each side of the centre of same are the supports, the lower ends of which are adapted to contact with the free ends 17 of the arms 18 which are each pivotally secured at one end to a bracket 19 secured to and extending outwardly from the side of the frame 16. Each support rests on a rib or seat 20 connecting the free ends of the arms. Formed integral with and projecting outwardly from the arms in proximity to the ends 17 of the arms 18 are the lugs 21 to which links 22 are connected by means of the pins 23. The other ends of the links pass through apertures 24 formed in the frame and are connected together by means of eccentric pins 25, the centre portions of which are connected to the ends of piston rods 26, slidably mounted in cylinders 27 secured to the frame plates. The ends 28 of the piston rods may be recessed to receive the eccentric pins, and caps 29 are bolted to the ends of the rods to hold the pins in place and allow easy access thereto for oiling and the like. The piston rods are moved in the cylinder by means of fluid fed thereinto through suitable ports, said fluid being adapted to press against the surfaces of the pistons 30 secured to the rods by means of the threaded nuts 31. The cylinders are bored to two diameters, the larger bore being made to suit the pistons 30, while the smaller bores are made to suit the control valves 32, which are of the piston type and are secured to rods 33 slidably mounted in the recesses 34 formed in the ends of the piston rods 26. The ends of the valve rods 33 remote from the valves 32 are each provided with a shoulder 35 which engages with the inner faces 36 of the nuts 31. The valves are of the hollow cylindrical type and are each partially closed at one end with the perforated wall 37 for the purpose hereinafter described. Fluid is supplied to the cylinders through the ports 38 to unlock the mechanism, the unlocking direction being shown by the arrow 39. The ports 38 extend along the walls of the cylinders and enter same approximately at the points where the bores of the cylinders are reduced. The fluid enters the cylinders through the ports 40 to move the pistons in the unlocking direction. The piston valves in moving in the direction indicated by the arrow uncover the ports 41 formed in the walls of the smaller bored portion of the cylinder. The outlets from said ports may be connected to the tilting or dumping cylinders 42 secured to the car frame or they may be connected so that the fluid from one of the unlocking cylinders may flow to the inlet port of another cylinder of the same construction. The connections are not shown but the operation of the device explained hereinafter will disclose the reason for such reference without the necessity for any special connection diagram. The dumping cylinders are secured to the centre sills of the frame by means of the brackets 43. Secured to the pistons working in the tipping cylinders are the piston rods 44, the upper ends of which contact with the tipping arms 45 secured to and depending from the underside of the movable portion of the car. Spacer castings 46 are secured to the sills between the plates and the upper portions 47 of said castings are provided with shoulders 48 against which the squared ends of the links butt to form locking means for holding the supporting arms in the locking position. Guiding grooves 49 are also formed in the castings to prevent side movement of the links during the operation of same. As already pointed out, a plurality of locking cylinders, arms and the like such as are shown in the drawings, are mounted on each car and, as a general rule, two tipping cylinders are supplied, one for tipping the car body in one direction as shown in dotted lines in Figure 1 and the other for tipping the car body in the opposite direction.

The operation of the device is as follows—fluid is supplied, under pressure, to the locking cylinders so that the piston will move in the direction indicated by the arrow. The air also flows through the perforations at the head of the piston valve. The piston rod, in moving, pulls on the links when they are in frictional contact with their respective supports through the medium of the eccentric locking bars which tend to straighten out and lift the square ends of the links clear of the locking edges of the castings, so that the arms may be pulled clear of the supports depending from the underside of the tipping or movable portions of the car. When the arms are not in frictional contact with the supports and the piston rod is moved in the unlocking direction the center portions of the eccentric pins come in contact with the projection 51 of the locking castings, so that the pins will roll over said projections and raise the link ends clear of the locking edges of said casting. The projections 51 are preferably placed below the center of the eccentric pins to accomplish the above object. The piston rods after moving through a predetermined distance carry with them the piston valves which uncover ports in the side of the cylinders and allow fluid to pass to one of the tipping cylinders or to another set of locking cylinders according to the manner in which they are connected. When all of the arms on one side of the car are drawn clear, the fluid passes to the tipping cylinder in such a manner that the car is tipped towards the released side. When returning to the loading or normal position, the fluid passes through the other tipping cylinder and from there to the locking cylinders through the locking port X. The pistons in moving in the direction opposite to that shown by the arrow throw the arms against the stops 50 and on further movement tend to bend the links which are pivotally connected to the eccentric locking bar. Movement of the links being stopped in one direction they drop or pivot about their supports allowing the square ends of the links to drop and engage with the locking surfaces of the castings between the plates of the center sills.

The device is very simple and efficient in operation and provides a positive fluid operated locking means for dump cars which is easily controlled. There is very little wear on the moving parts and all parts are so positioned that they are accessible for repairs.

Having thus described our invention, what we claim is:—

1. In a dump car locking mechanism, a movable section mounted on a fixed section, supports depending from the movable section, arms adapted to contact with the movable section when it is in the normal position, said arms being pivotally connected to the fixed section, links each secured at one end to the arms and the other end to an eccentric locking pin, the centre portion of which is secured to a power transmitting piston, and locking means secured to the fixed portion and adapted to contact with the ends of the links remote from the arms when the car is in the normal position.

2. In a dump car mechanism, a dump car having a movable section pivotally mounted on a fixed section, arms pivotally secured to the fixed section and adapted to contact with supports depending from the movable section, links for operating the arms, stops for the arm operating links, fluid operated means for locking and unlocking the movable section, eccentric pins connecting the ends of the links with the fluid operated means, and locking castings secured to the fixed section and adapted to engage with the ends of the links when the car is in the normal or loading position.

3. In a dump car locking mechanism, locking arms pivotally secured to the fixed portion of the car and engaging with the movable portion thereof when the car is in the loading position, locking castings secured to the fixed portion of the car, said castings having shoulders formed thereon, links secured to the arms and adapted to engage with the shoulders when the car is in the loading position, fluid operated means including a cylinder, a piston operating therein and equipped with a piston rod and eccentric pins connecting the links to the piston rod so that, on movement of the rod, the links are raised clear of the shoulders on the locking casting.

4. In a dump car locking mechanism, supporting arms pivotally secured to the fixed portion of the car and adapted to contact with the dumping portion when the car is in the normal position, links secured to the said arms and adapted at one of their ends to contact with a shoulder formed in a locking casting secured to the fixed portion of the truck, guides formed in said locking castings for said links, eccentric pins secured to the ends of the links which contact with the locking casting, fluid operated means connected to said eccentric pins and adapted on operation, to raise the links clear of the shoulders and pull the arms out of engagement with the movable section, to limit the movement of said arms, and to cause said links to engage with the shoulders when the fluid operated means is moved to place the arms in engagement with the movable section.

In witness whereof, we have hereunto set our hands.

ERNEST R. VIBERG.
ALFONZ L. LINDERBLAD.